United States Patent

[11] 3,591,309

[72] Inventors: Robert A. Ray, Fullerton; August Hell, Whittier, both of, Calif.
[21] Appl. No. 837,695
[22] Filed: June 30, 1969
[45] Patented: July 6, 1971
[73] Assignee: Beckman Instruments, Inc.,

[54] MIXER AND FILTER COMBINATION FOR DISCRETE SIMPLE CONTAINERS
5 Claims, 4 Drawing Figs.

[52] U.S. Cl. ........................... 416/3, 416/237, 416/247
[51] Int. Cl. ........................... B01f 7/00
[50] Field of Search ............... 416/3, 237, 247; 259/139

[56] References Cited
UNITED STATES PATENTS

| | | | |
|---|---|---|---|
| 2,655,354 | 10/1953 | Murray | 416/3 X |
| 3,035,781 | 5/1962 | Wallen | 416/176 X |
| 3,116,913 | 1/1964 | Lane | 416/3 X |
| 3,245,665 | 4/1966 | Steel | 416/3 |
| 2,932,494 | 4/1960 | Wales | 416/247 X |

Primary Examiner—Everette A. Powell, Jr.
Attorneys—Paul R. Harder and Robert J. Steinmeyer ABSTRACT: A body member is disclosed which has a shape compatible with a discrete sample container and at least one ramp surface for the purpose of propelling and thereby mixing a fluid in a container as the body is rotated. A filter is attached to one end of the body member for the purpose of intercepting unwanted particles and fibers in the fluid. A magnet is embedded in the body to render the mixing body and filter combination responsive to alternating magnetic fields thereby causing rotation.

PATENTED JUL 6 1971  3,591,309

INVENTORS
ROBERT A. RAY
AUGUST HELL
BY Paul L. Harder
ATTORNEY

MIXER AND FILTER COMBINATION FOR DISCRETE SIMPLE CONTAINERS

This disclosure relates to a mixing body and filter combination and in particular to a body member having a shape compatible with a discrete sample container and having fluid-propelling ramp surfaces and a filter attached to one end to intercept undesired particles and fibers in the fluid propelled by the ramp surfaces as the body is rotated.

In the field of discrete sample analysis, it is necessary to measure various parameters associated with reactions initiated in sample containers. Some of these measurements are directed to the determination of optical density or color of the sample in the container. Other measurements involve spectral absorption of the sample. Still another measurement involves the fluorescence of a sample in response to an illuminating source. In all of these measurements it is desired to have the sample mixed thoroughly with any added reagent or reacting material and also to be free from the presence of any foreign unwanted particles or fibers.

An example of a discrete sample analyzer requiring well-mixed and filtered samples is the fluorometer. In this instrument a discrete sample container is illuminated by a source of electromagnetic energy to cause the sample to fluoresce as an indication of the rate of reaction taking place within the container. The desired parameter is the rate at which the fluorescence from the sample changes. In order to obtain complete reaction of all the substances within the sample container the sample solution or fluid must be stirred. In addition, particles of dust and fibers, common to many laboratories, which contaminate the sample thereby creating high noise levels in the detected fluorescence measurement must be removed from the sample.

It has been the practice when performing fluorescence measurement and other discrete sample analyses, to insert within the sample container a mixing or stirring magnet. In some cases the magnet consists merely of a small bar or rod of magnetic material covered with a plastic coating to isolate the magnet from the sample solution. Other forms of the mixing magnet have been an embedded bar magnet within a plastic pellet, the pellet having rectangularly shaped mixing vanes attached at one end. Still another form consists of a cylindrical magnet itself formed in the shape of a pellet wherein a groove along a diameter at one end, forming the north and south poles therefore, provides a mixing channel.

All of the above shapes provide various degrees of mixing within the sample container as the mixing magnet is rotated by an alternating magnetic field applied to the sample container. The magnetic field may be generated by rotating a permanent magnet in the vicinity of the sample container or by a magnetic field generated by an alternating current.

The problems encountered with the above magnetic stirrers have been lack of filtering and poor mixing. None of the magnetic stirrers or mixing magnets used in the prior art have incorporated any filtering of the sample within the container. In addition the mixing shapes employed have been directed primarily to agitation of the solution rather than to establish a well-defined and efficient mixing flow throughout the geometry of the sample container. As a result, the prior art magnetic stirrers have proved inadequate.

Accordingly, it is the object of the present invention to provide a discrete sample magnetic mixer and filter combination responsive to an alternating magnetic field so as to rotate therein for the purpose of mixing and filtering samples into which the magnetic mixer and filter combination is placed.

Another object of this invention is to provide a mixing body and filter combination, the mixing body having fluid-propelling inclined ramp surfaces to propel a sample fluid through an attached filter and through the confines of a sample container to provide thorough mixing and filtering thereby as the combination rotates.

A still further objective of the present invention is to provide a magnetic mixing body having a shape compatible with a sample container into which it is inserted and having a filter mesh attached to one end and at least one inclined ramp surface to propel fluids within the container through the filter and throughout the geometry of the container as the mixing body rotates in response to an applied alternating magnetic field. The above objects along with other features and objects of the invention will be better understood from a consideration of the detailed description when read in conjunction with the attached drawings in which like numbers refer to like parts and in which:

Figure 2:
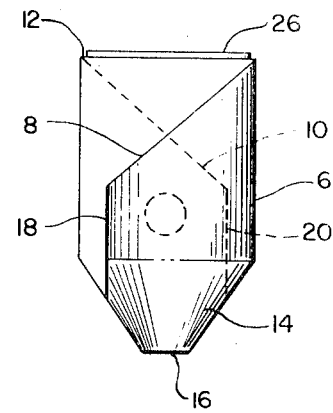
FIG. 2 illustrates a side view of the mixing body and filter combination.
Figure 4:
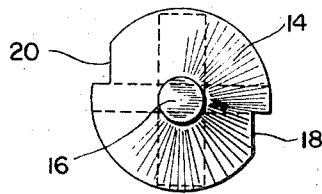
Figure 3:
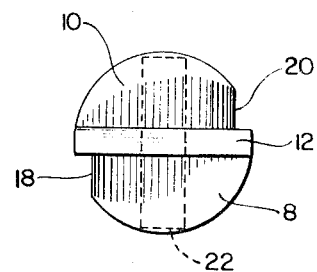

FIG. 3 illustrates an end view of the mixing body, to which end the filter is attached; and FIG. 4 illustrates an end view of the mixing body, which end rests on the sample container surface into which the body is inserted. Referring now to FIGS. 1—4, the cylindrical mixing body 6 has inclined ramp surfaces 8 and 10. The inclined ramp surfaces 8 and 10 are separated by a thin wall member 12. One end of the mixing body 6 has a conical surface 14 truncated by a flat surface 16. A slot 18 connects incline ramp surface 8 to conical surfaces 14 and is cut parallel to the axis in the peripheral surface of the cylindrical mixing body 6. A bar magnet 24 is inserted into a void 22 in the mixing body 6, the void 22 being positioned perpendicular to the axis of the body 6 and along the diameter of the cylindrical body 6. A mesh filter 26 is attached to the end surface of the thin-walled member 12.

Referring now to FIG. 4, a slot 20 similar to slot 18 connects conical surface 14 with incline ramp 10.

Considering now the operation of the mixer filter combination, the entire combination is placed inside a sample container or test tube containing the sample to be measured. The exemplary embodiment of the mixer filter combination as taught by the present invention is illustrated in the drawings FIGS. 1—4 as being cylindrical in shape so as to fit into a circular or square cross section sample container. Referring to FIG. 2, the mixing body 6 has a conical surface 14 at one end truncated by a flat surface 16 upon which the filter mixer combination rests inside the sample container. In addition to the conical surface 14 and flat surface 16, a long spike (not illustrated) of appropriate length may be added at the surface 16 to position the mixing body and filter combination at any point within the sample container.

In some applications it is desired that the mixing body fit snugly into the sample container. Therefore, in FIG. 2, slot 18 (visible) and 20 (not visible and shown by the dashed line) allow sample fluid to flow past the mixing body as the mixing body and filter combination is inserted into the sample container. The slots 18 and 20 are further illustrated by the two views along the axis of the mixing body provided in FIGS. 3 and 4.

Referring further to FIG. 2, the inclined ramp surfaces 8 and 10 (where ramp surface 10 is not visible but is shown by the dashed line), provide the fluid propelling surfaces when the mixing body is rotated. If the mixing body 6 is rotated clockwise, as viewed from the end to which filter 26 is attached, the fluid in contact with the surfaces 8 and 10 will be forced upward and away from the surfaces into the upper regions of the sample in the sample container. The maximum upward motion of the sample fluid will occur at the upper end of the inclined ramp 8. Fluid returns at the lower end of ramps 8 and 10 to take the place of that forced away at the upper end.

Referring now to FIG. 3, as the mixing body rotates in a clockwise direction, the fluid motion resulting from the propelling effect of inclined ramps 8 and 10 will be that fluid will flow out of the page at the end of ramp 8 most distant from the slot 18 and at the end of the ramp 10 most distant from the slot 20. Fluid flow will be into the page of the drawing over the area of the ramp 8 adjacent to the slot 18 and over the area of the ramp 10 adjacent to the slot 20. The thin-walled member 12 prevents the fluid circulation pattern set up from "short circuiting" through the center of the body 6 and keeps the fluid-circulating paths long in length. Thin-walled member 12 also serves as a mounting support for the filter 26.

When circular filter 26, which is not shown in FIG. 3, is placed at its proper position in FIG. 3, it is apparent that filter 26 intercepts the flow pattern described hereinabove. Therefore, unwanted particles and fibers within the solution are essentially trapped in four areas of the filter. Two of the areas occur where the fluid flow is upward away from the face of the inclined ramps 10 and 8, and two of the areas are where the fluid flow is downward toward the inclined ramps over the slots 18 and 20. It may be desirable under some circumstances not to filter the downward flow of fluid and therefore to cut the circular filter 26 such that sections of it are removed over the areas where downward flow occurs. The advantage of such a construction would be that the unwanted particles and fibers would be trapped on the side of the filter toward the mixing body and would be less likely to find their way back into the main body of the sample solution.

Figure 1:
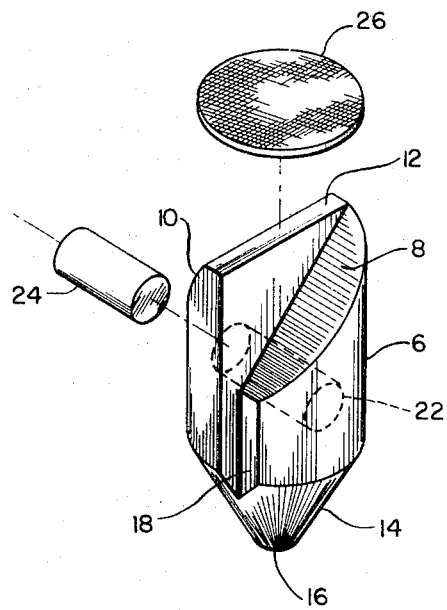
FIG. 1 is an exploded pictorial view of a mixing body and filter combination and associated magnet illustrating an exemplary embodiment in accordance with the teachings of this invention.

The bar magnet 24, illustrated in FIG. 1, placed in the void position 22 within the mixing body, as illustrated in FIGS. 1—4 provides the method by which the mixer body and filter combination can be rotated. When the mixing body and filter combination with embedded magnet 24 is placed in a sample container and an alternating magnetic field is applied, the mixing body and filter combination rotates.

An example of the type of material which has been found suitable for a mixing body and filter combination constructed in accordance with the teachings of the present invention, is plastic. Many plastics are inert and generally nonreactive with the samples into which they may be placed and are easily machined or molded to provide the surfaces and body shape required. The filter 26 is a plastic mesh of 30 to 40 strands per inch.

It now should be apparent that the present invention provides a mixing body and filter combination for mixing and filtering samples in discrete sample containers to ensure more complete solution mixing and to enhance the quality of measurements by removing unwanted fibers and particles. Although particular shapes and materials have been discussed, in connection with the specified embodiment of the mixing body and filter combination constructed in accordance with the teachings of the present invention, others may be utilized. Furthermore, it will be understood that though an exemplary embodiment of the present invention has been disclosed and discussed, other applications and mechanical arrangements are possible and that the embodiment disclosed may be subjected to various changes, modification and substitutions without necessarily departing from the present invention.

What we claim is:

1. A discrete sample magnetic mixer and filter combination responsive to an alternating magnetic field so as to be rotated thereby for the purpose of mixing and filtering samples into which said combination is placed comprising:

a cylindrical body of nonmagnetic material having a truncated cone formed at one end thereof and first and second ramp surfaces oppositely disposed and separated by a thin-walled portion formed at the other end, each surface disposed so as to contain a straight line perpendicular to and intersecting the axis of said cylindrical body, each surface also disposed to form an acute angle with said axis and to extend from the periphery of said cylindrical body to said thin-walled portion, said thin-walled portion being disposed to contain the axis of said cylindrical body and perpendicular to said first and second ramp surfaces, said thin-walled portion having an end perpendicular to said axis;

a bar magnet embedded in said body and perpendicular to said axis and along a diameter thereof for making said body responsive to said alternating magnetic field so as to rotate therein; and circular filter means having a diameter substantially the same as said body and secured to said perpendicular end of said thin-walled portion for filtering unwanted particles and fibers present in the sample propelled through said filter by said first and second ramp surfaces when said mixer and filter combination is rotated.

2. The discrete sample mixer defined in claim 1 wherein said circular filter means comprises a circular disc of plastic mesh.

3. The discrete sample mixer defined in claim 1 wherein said nonmagnetic material body is composed of plastic.

4. Mixer and filter means for mixing and filtering a fluid in a container comprising:

a body member having a shape compatible with said container and at least one ramp surface for propelling said fluid when said body member is rotated; and a filter attached to said body for filtering particles and fibers from the fluid propelled through said filter by said ramp surface.

5. The mixer and filter means defined in claim 4 wherein said body member further includes a magnet embedded in said body member so as to render said body member responsive to an alternating magnetic field for rotating said body member in said container.